(12) United States Patent
Miyamori et al.

(10) Patent No.: US 10,003,932 B2
(45) Date of Patent: Jun. 19, 2018

(54) PARTICIPATION REQUEST MESSAGING TO MEMBERS OF A CONVERSATION GROUP

(71) Applicant: Kabushiki Kaisha Toshiba, Minato-ku, Tokyo (JP)

(72) Inventors: Shoko Miyamori, Kawasaki Kanagawa (JP); Kouji Ueno, Mishima Shizuoka (JP); Tetsuro Chino, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days. days.

(21) Appl. No.: 15/244,791

(22) Filed: Aug. 23, 2016

(65) Prior Publication Data
US 2017/0064520 A1 Mar. 2, 2017

(30) Foreign Application Priority Data
Aug. 24, 2015 (JP) ................................. 2015-164876

(51) Int. Cl.
*H04W 4/08* (2009.01)
*H04W 4/10* (2009.01)
*H04W 8/18* (2009.01)

(52) U.S. Cl.
CPC .............. *H04W 4/08* (2013.01); *H04W 4/10* (2013.01); *H04W 8/186* (2013.01)

(58) Field of Classification Search
CPC ........... H04W 4/06; H04W 4/08; H04W 4/10; H04W 4/12; H04W 4/14; H04W 8/186;
(Continued)

(56) References Cited

U.S. PATENT DOCUMENTS 7,278,921 B1    10/2007  Fujisawa et al.
8,059,574 B2 *  11/2011  Roy ........................ H04W 4/06
                                            370/261
(Continued)

FOREIGN PATENT DOCUMENTS

JP     H11-355202 A    12/1999
JP     2001-184288 A    7/2001
(Continued)

OTHER PUBLICATIONS

Kentaro, T., "SNS for Home Healthcare Enabling Registration by Voice at Anytime and Anywhere", Sep. 12, 2014 [searched on Apr. 15, 2015], http://www.chubu.meti.go.jp/technology_jyoho/download/20140912/20140912toshiba.pdf.

*Primary Examiner* — Philip Sobutka
(74) *Attorney, Agent, or Firm* — Knobbe, Martens, Olson & Bear, LLP (57) ABSTRACT

According to an embodiment, a communication support apparatus supports communication among users. The apparatus includes a message receiver to receive a message from a user terminal; a participation request transmission controller to control such that, when the received message is a participation request message, the participation request message is transmitted to a user terminal to which the participation request message is to be transmitted; a response receiver to receive a response to the participation request message from the user terminal to which the participation request message has been transmitted; a group generator to generate a conversation group including as members the user terminal that has responded to the participation request message and the user terminal serving as a transmission source; and a conversation controller to control delivery of messages in the conversation mode such that a message (Continued)

received from a member of the conversation group is transmitted to another member.

10 Claims, 7 Drawing Sheets

(58) Field of Classification Search
CPC ..... H04W 76/005; H04W 76/02; H04W 4/18; H04W 4/206
USPC .................. 455/518–520; 370/261, 312, 432
See application file for complete search history.

(56) References Cited

U.S. PATENT DOCUMENTS

| | | | |
|---|---|---|---|
| 8,090,397 | B2 | 1/2012 | Inagaki |
| 2007/0072637 | A1 | 3/2007 | Inoue |
| 2012/0265575 | A1 | 10/2012 | Torii et al. |
| 2013/0315108 | A1* | 11/2013 | Lindner ................. H04W 4/08 370/277 |
| 2015/0071426 | A1* | 3/2015 | Weiner .................... H04L 51/04 379/204.01 |
| 2016/0132608 | A1* | 5/2016 | Rathod ............. G06F 17/30867 707/722 |

FOREIGN PATENT DOCUMENTS

| | | |
|---|---|---|
| JP | 2007-096366 A | 4/2007 |
| JP | 2007-243657 A | 9/2007 |
| JP | 2008-067083 A | 3/2008 |
| JP | 5166569 B2 | 3/2013 |
| WO | WO 01/27771 A1 | 4/2001 |
| WO | WO 2007/119586 | 10/2007 |

* cited by examiner

PARTICIPATION REQUEST MESSAGING TO MEMBERS OF A CONVERSATION GROUP

CROSS-REFERENCE TO RELATED APPLICATIONS

This application is based upon and claims the benefit of priority from Japanese Patent Application No. 2015-164876, filed on Aug. 24, 2015; the entire contents of which are incorporated herein by reference.

FIELD

Embodiments described herein relate to a communication support apparatus, a communication support method, and a computer program product.

BACKGROUND

Various types of systems have been developed that support communication carried out among users through message exchange using information communications technologies. Group call of cellular phone systems, chat systems, and intercom systems, for example, are known particularly as systems that enable conversation among member users of a group.

To allow member users of a group to converse with each other, a group is first formed to contain the member users who participate in a conversation. In this process, known systems require a first member user who wants to initiate a conversation to perform troublesome operations, including sending a participation request to a specifically designated second member user whom the first user wants to participate in the conversation and specifying requirements of the member user for the participation in the conversation. The second member user, in this case, may often find it difficult to determine whether to accept the participation request when not knowing the theme of the conversation. Therefore, there is a need for an arrangement that allows a participation request together with information on the theme of the conversation to be made through a simple operation to achieve conversation among specific member users.

DETAILED DESCRIPTION

According to an embodiment, a communication support apparatus supports communication among users by delivering messages to user terminals. The apparatus includes a message receiver, a participation request transmission controller, a response receiver, a group generator, and a conversation controller. The message receiver receives a message from a user terminal. The participation request transmission controller controls such that, when the received message is a participation request message that requests participation in a conversation mode, the participation request message is transmitted to a user terminal to which the participation request message is to be transmitted. The response receiver receives a response to the participation request message from the user terminal to which the participation request message has been transmitted. The group generator generates a conversation group that includes as members the user terminal that has responded to the participation request message and the user terminal serving as a transmission source of the participation request message. The conversation controller controls delivery of messages in the conversation mode such that a message received from a member of the conversation group is transmitted to another member of the conversation group.

An embodiment will be described in detail with reference to the accompanying drawings. Although the embodiment described below assumes an application to a server intended for use in the voice communication system disclosed in "Home Healthcare SNS Enabling Time- and Place-Independent Voice Registration" by Kentaro Torii, the application is illustrative only and is not limited thereto. The communication support apparatus, the communication support method, and the computer program may be applied effectively to, for example, a mode in which terminals directly transmit and receive messages without having any server involved therein and a mode that handles messages other than voice.

Figure 1:
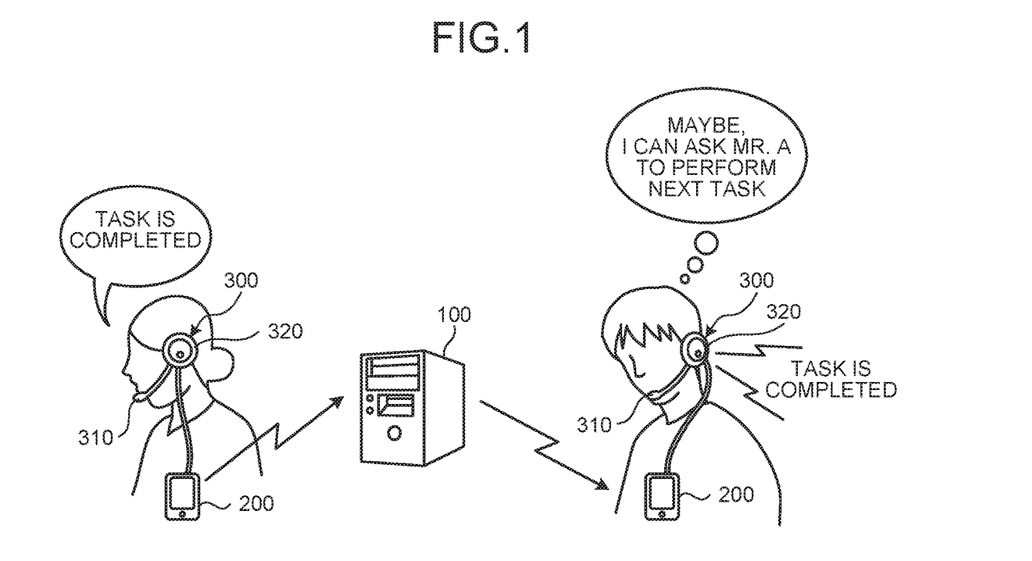
FIG. 1 is a schematic view of a voice communication system.

The following describes, with reference to FIG. 1, an overview of a voice communication system according to the embodiment. FIG. 1 is a schematic view of the voice communication system according to the embodiment. As illustrated in FIG. 1, each of users who receive a service of the voice communication system carries a user terminal 200 such as a smartphone with him or her. The user performs various tasks while wearing a headset 300 connected to the user terminal 200. When a first user produces an utterance of a message relating to a task or an observation made during a task, the utterance is recorded by a microphone 310 of the headset 300 and transmitted to a server 100 as a voice message. The server 100, having received the voice message from the user terminal 200, stores the voice message with metadata. The metadata may, for example, be generated through a voice recognition process performed for the voice message by the server 100 or appended during transmission of the voice message on the side of the user terminal 200. Alternatively, the metadata may even be a combination of the foregoing.

The server 100 establishes a transmission destination and transmission timing of the stored voice message using, for example, the metadata of the stored voice message, user information including information on tasks of each user stored in advance, and sensor data separately transmitted from each user terminal 200. The server 100 transmits the stored voice message at appropriate timing to another user terminal 200 established as the transmission destination. In this process, any voice message that is determined to have a high level of urgency is transmitted immediately (substantially on a real time basis). To a user terminal 200 in which reception of the voice message is temporarily difficult due to, for example, the user terminal being at a site where radio waves are hard to receive, the voice message is transmitted with a delay after the reception of the voice message is enabled. The other user terminal 200 that has received the voice message automatically reproduces the received voice message and outputs the reproduced voice message from a speaker 320 of the headset 300. These operations enable a second user to listen to the utterance of the first user, so that information sharing can be promoted between the users through the voice message.

Figure 2:
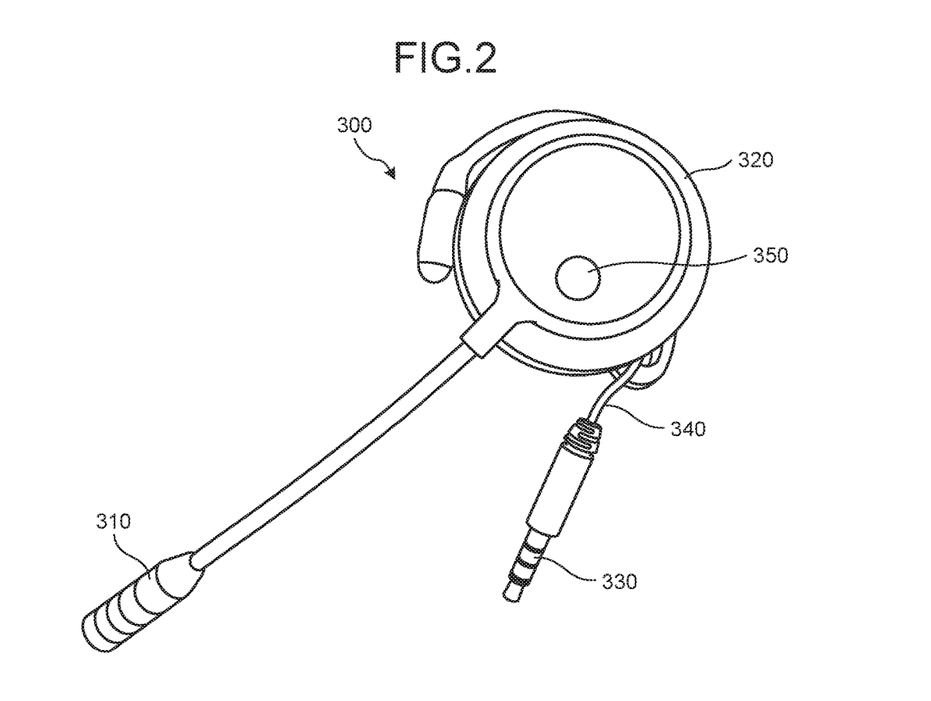
FIG. 2 is a diagram of an exemplary headset.

FIG. 2 is a diagram of an exemplary headset 300 to be worn by the user. As illustrated in FIG. 2, the headset 300 becomes operative when a phone plug 330 is inserted into a phone jack of the user terminal 200. A cable 340 having the phone plug 330 at a distal end can be wound into a housing of the speaker 320. The microphone 310 is integrated with the housing of the speaker 320.

The housing of the speaker 320 includes an operating button 350 disposed at a position at which the user can operate the operating button 350 easily. The operating button 350 is operated by the user to start and end recording of the utterance. Specifically, the user presses the operating button 350 to start the recording of the utterance before the voice message is reproduced and presses the operating button 350 a second time to end the recording of the utterance. The configuration of the headset 300 illustrated in FIG. 2 is illustrative only and not limiting.

The communication support apparatus in the embodiment can be achieved, for example, as the server 100 illustrated in FIG. 1. In this case, the server 100 has a function of controlling delivery of the voice message through a conversation mode, in addition to the basic function of delivering the voice message described above. The conversation mode refers to an operating mode in which a temporary group that includes as members some user terminals 200 capable of making immediate responses (hereinafter referred to as a conversation group) is generated and voice messages are transmitted and received among the members of the conversation group.

The user who initiates the conversation mode performs a predetermined operation, such as pressing the operating button 350 of the headset 300 twice in succession, before producing an utterance of a message that requests participation in the conversation mode. This operation appends to a voice message that represents the utterance of the user recorded by the microphone 310 metadata that indicates that the voice message is a participation request message requesting participation in the conversation mode and causes the metadata to be transmitted from the user terminal 200 to the server 100. Because the request for participation in the conversation mode is made using the voice message, the user who initiates the conversation mode can include a theme of the conversation in the participation request.

The server 100, having determined on the basis of the metadata appended to the received voice message that the voice message is a participation request message, automatically determines other user terminals 200 as transmission destinations for the participation request message using, for example, user information associated with the user terminal 200 serving as a transmission source of the participation request message. The server 100 then transmits the participation request message to the determined user terminal 200.

The user terminal 200 that has received the participation request message automatically reproduces the received participation request message to output the utterance of the user who has initiated the conversation mode from the speaker 320. When a predetermined operation is performed, such as pressing the operating button 350 of the headset 300, for a predetermined period of time (e.g., 20 seconds) from the reception and reproduction of the participation request message, the user terminal 200 that has received the participation request message transmits a response to the participation request message to the server 100. In this process, a voice message that records an utterance of the user after the predetermined operation may be transmitted to the server 100 together with the response to the participation request message.

The server 100 receives responses from the user terminals 200 to which the participation request message has been transmitted for a predetermined period of time after the participation request message has been transmitted. The server 100 generates a conversation group having as members the user terminals 200 that have responded to the participation request message and the user terminal 200 serving as the transmission source of the participation request message. The conversation group is generated such that, for example, the user terminal 200 serving as the transmission source of the participation request message is registered as a first member and the user terminals 200 that have responded to the participation request message are additionally registered as members of the conversation group in order of reception of the response to the participation request message. The server 100 controls delivery of the voice message in the conversation mode such that a voice message received from a member of the conversation group is transmitted to other members of the conversation group.

As described above, the voice communication system in the present embodiment treats a voice message produced through an utterance by the user who has initiated the conversation mode as a participation request message, automatically determines user terminals 200 to which the participation request message is to be transmitted and generates a conversation group having as members the user terminals 200 that have responded to the participation request message and the user terminal 200 serving as the transmission source of the participation request message, and controls the delivery of the voice message in the conversation mode. The present embodiment thus can efficiently achieve conversation among specific user members through a participation request that can also convey the theme of the conversation and that can be made through a simple operation.

It should be noted that the present embodiment assumes that a user terminal 200 and a user who uses the user terminal 200 are associated with each other on a one-to-one correspondence basis. Thus, if a user terminal 200 is a member of a conversation group, the user who uses that particular user terminal 200 is a member of the conversation group.

The following describes a specific exemplary configuration of the communication support apparatus in the present embodiment, assumed to be achieved as the server 100. In the following, the communication support apparatus is denoted as 100, the same reference numeral as that used to denote the server 100.

Figure 3:
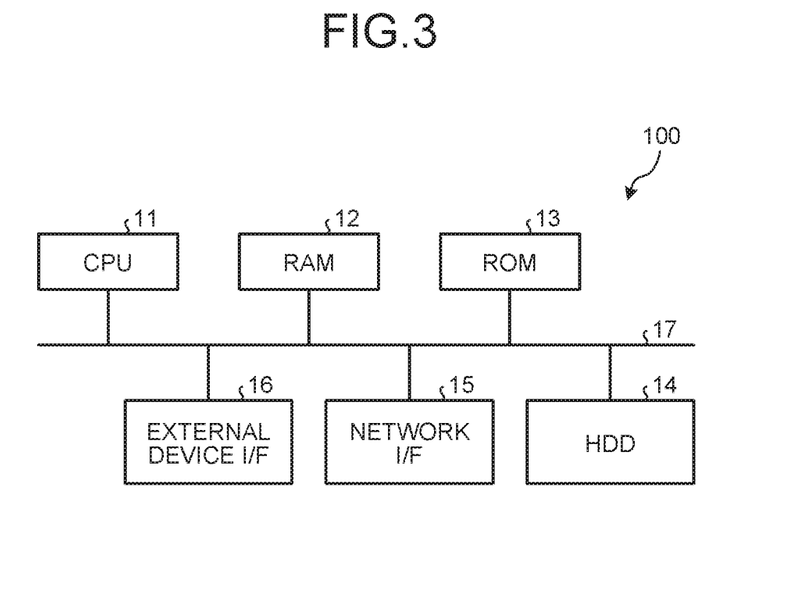
FIG. 3 is a block diagram of an exemplary hardware configuration of a communication support apparatus.

FIG. 3 is a block diagram of an exemplary hardware configuration of the communication support apparatus 100 in the embodiment. The communication support apparatus 100 may incorporate, for example, a hardware configuration as a common computer. In this case, the communication support apparatus 100 includes, as illustrated in FIG. 3, a central processing unit (CPU) 11, a random access memory (RAM) 12, a read only memory (ROM) 13, a hard disk drive (HDD) 14, a network I/F 15, an external device I/F 16, and a bus 17 that connects the foregoing elements with each other.

The communication support apparatus 100 in the embodiment causes the CPU 11 to use the RAM 12 as a work area to execute a program stored in the ROM 13 or the HDD 14, thereby being capable of achieving various functions as the server 100 in the voice communication system described above. The network I/F 15 serves as a communication interface that allows the communication support apparatus 100 to communicate with the user terminal 200. The external device I/F 16 is an interface for connecting, for example, a display such as a liquid crystal display and an operating input device such as a keyboard and a mouse with the communication support apparatus 100.

Figure 4:
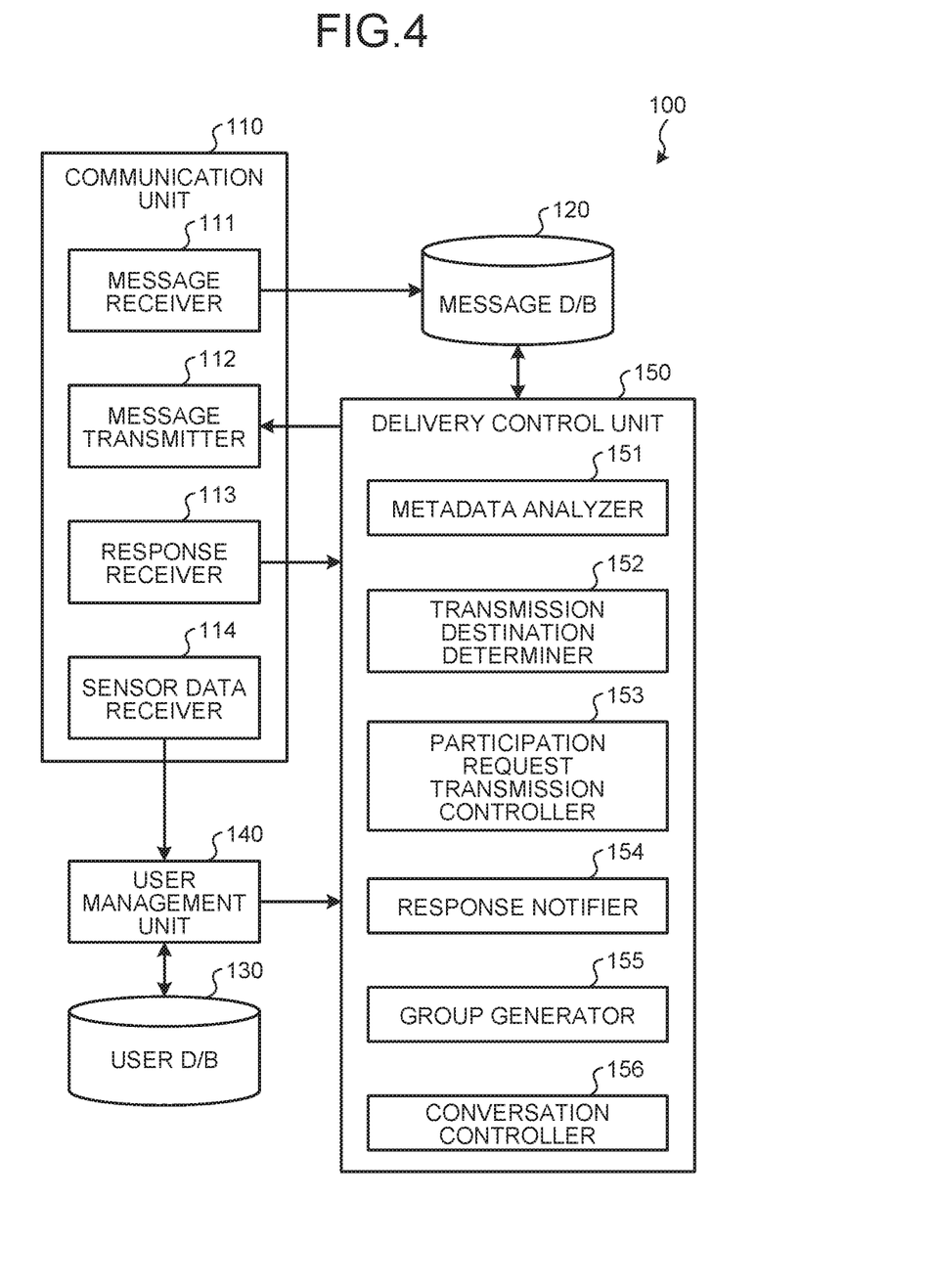
FIG. 4 is a block diagram of an exemplary functional configuration of the communication support apparatus.

FIG. 4 is a block diagram of an exemplary functional configuration of the communication support apparatus 100 in the embodiment. As illustrated in FIG. 4, the communication support apparatus 100 includes, as functional elements achieved through cooperation between the above hardware elements and software (program), a communication unit 110, a message D/B 120, a user D/B 130, a user management unit 140, and a delivery control unit 150.

The message D/B 120 stores the voice message received from the user terminal 200 together with the metadata. The message D/B 120 can be achieved using, for example, a storage area made available in the HDD 14. The user D/B 130 holds user information of each user registered in advance. The user D/B 130 can be achieved using, for example, a storage area made available in the HDD 14. The user information includes various types of user-related information including information on the task of the user, schedule information, and information on the user terminal 200 used by the user. The user information relating to the conversation mode, in particular, is held in the user D/B 130 as a group management table Tb (see FIG. 5) to be described later.

The communication unit 110 is a functional module that communicates with the user terminal 200 using the network I/F 15. The communication unit 110 includes, as submodules, a message receiver 111, a message transmitter 112, a response receiver 113, and a sensor data receiver 114.

The message receiver 111 receives a voice message from the user terminal 200. The voice message received by the message receiver 111 is stored with metadata of the voice message in the message D/B 120. If the voice message received by the message receiver 111 is a message having a high level of urgency, such as a participation request message, that particular voice message is read immediately from the message D/B 120.

The message transmitter 112 transmits the voice message read from the message D/B 120 to a specified transmission destination, as controlled by the delivery control unit 150.

When a response to a participation request message is received from the user terminal 200 that has transmitted the participation request message, the response receiver 113 receives the response. The response to the participation request message received by the response receiver 113 is passed on to the delivery control unit 150.

The sensor data receiver 114 receives sensor data transmitted from the user terminal 200. The sensor data represents data output from a sensor, such as a position sensor and an acceleration sensor, included in the user terminal 200. The sensor data received by the sensor data receiver 114 is passed on to the user management unit 140.

The user management unit 140 is a functional module that estimates a user status using the user information held in the user D/B 130 and the sensor data received by the sensor data receiver 114. The user management unit 140 can, for example, estimate whether the user is ready to respond to the participation request message on the basis of, for example, user schedule information and sensor data. Additionally, the user management unit 140 also has a function of reading from the user D/B 130 user information including the group management table Tb in response to a request made from the delivery control unit 150. The user status estimated by the user management unit 140 and the user information read from the user D/B 130 are passed on to the delivery control unit 150.

The delivery control unit 150 is a functional module that controls delivery of the voice message. The delivery control unit 150 establishes the transmission destination and transmission timing of the voice message on the basis of, for example, the metadata of the voice message stored in the message D/B 120 and information from the user management unit 140. The delivery control unit 150 controls operations of the message transmitter 112 such that the voice message is transmitted to the appropriate transmission destination at appropriate timing. The delivery control unit 150 in the communication support apparatus 100 in the embodiment, in particular, includes the following sub-modules as functions relating to the conversation mode: a metadata analyzer 151, a transmission destination determiner 152, a participation request transmission controller 153, a response notifier 154, a group generator 155, and a conversation controller 156.

The metadata analyzer 151 determines whether the voice message is a participation request message on the basis of the metadata appended to the voice message. When the voice message received by the message receiver 111 from the user terminal 200 is a participation request message, that particular voice message is stored in the message D/B 120 together with the metadata that indicates that the voice message in question is a participation request message. Thus, the metadata analyzer 151 can determine that the voice message in question is a participation request message on the basis of the metadata appended to the voice message.

When the voice message received from the user terminal 200 is a participation request message, the transmission destination determiner 152 determines the user terminals 200 to which the participation request message is to be transmitted. For example, the transmission destination determiner 152 can determine the user terminals 200 to which the participation request message is to be transmitted in accordance with the group management table Tb read by the user management unit 140 from the user D/B 130.

Figure 5:
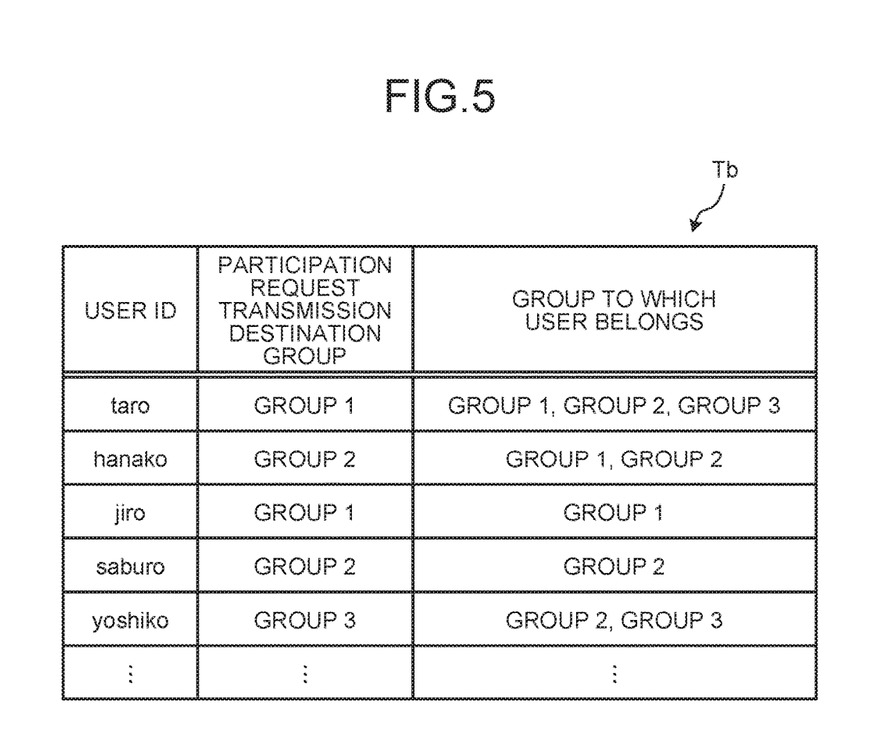
FIG. 5 is a diagram of an exemplary group management table.

FIG. 5 is a diagram of an exemplary group management table Tb. The group management table Tb stores a participation request transmission destination group set in advance for each user and a group to which each user belongs, each being associated with a user ID that serves as identification information of each user. The "group" as used herein represents a unit in which the conversation is held and one user may belong to a plurality of groups. The "participation request transmission destination group" as used herein represents the group to which the user as the participation request message transmission destination belongs. Specifically, the "participation request transmission destination group" indicates that a participation request message received from the user terminal 200 of a first user needs to be transmitted to the user terminal 200 of a second user who belongs to the participation request transmission destination group associated with the user ID of the first user.

The transmission destination determiner 152 refers to the group management table Tb as illustrated in FIG. 5 to be able to determine the user terminal 200 to which the participation request message is to be transmitted. In the example of the group management table Tb illustrated in FIG. 5, when the participation request message is received from the user terminal 200 of "taro", for example, the user terminal 200 of "hanako" and the user terminal 200 of "jiro", both "hanako" and "jiro" belonging to "group 1" set as the participation request transmission destination group of "taro", can be determined as the transmission destinations of the participation request message.

The transmission destination determiner 152 may exclude, out of the user terminals 200 determined as the transmission destinations of the participation request message on the basis of the group management table Tb, the user terminal 200 of a user who is estimated by the user management unit 140 to be unable to respond to the participation request message from the transmission destinations. This arrangement prevents any inconvenience caused to a task of a user by the participation request message being reproduced on the user terminal 200 of the user who may, for example, be working on the task and thus be unable to respond to the participation request message.

The participation request transmission controller 153 controls operations of the message transmitter 112 such that the participation request message is transmitted to the user terminals 200 determined by the transmission destination determiner 152. In this process, preferably, the participation request transmission controller 153 controls operations of the message transmitter 112 such that the participation request message is transmitted to only the user terminal 200 that is determined to be ready to receive the voice message out of the user terminals 200 determined by the transmission destination determiner 152. Specifically, the participation request transmission controller 153 controls such that, out of the user terminals 200 determined as the transmission destinations of the participation request message by the transmission destination determiner 152, the user terminal 200 that is not ready to receive the voice message is excluded from the transmission destinations, and the voice message is transmitted only to the user terminals 200 that are ready to receive the voice message. The participation request transmission controller 153 can determine whether a user terminal 200 determined by the transmission destination determiner 152 is ready to receive the voice message on the basis of, for example, whether a response is returned to a predetermined signal transmitted to that particular user terminal 200.

When the response receiver 113 receives a response to the participation request message from any of the user terminals 200 to which the participation request message has been transmitted, the response notifier 154 notifies other user terminals 200 to which the participation request message has been transmitted of the specific user terminal 200 that has responded to the participation request message. The notification of the response to the participation request message can be achieved, if the response is accompanied by a voice message, for example, by transmitting the voice message from the message transmitter 112 to the other user terminals 200 to which the participation request message has been transmitted. If the response is not accompanied by a voice message, the message transmitter 112 may transmit to the other user terminals 200 to which the participation request message has been transmitted a set voice message informing of the user who has responded to the participation request message, e.g., a voice message stating that "Mr. X will participate in the conversation".

The notification by the response notifier 154 of the response to the participation request message made to the other user terminals 200 to which the participation request message has been transmitted enables the users of the other user terminals 200 to which the participation request message has been transmitted to grasp which specific user will participate in the conversation, so that the users can use the notification as a basis for determining whether the users themselves will participate in the conversation.

The group generator 155 generates a conversation group that includes as members the user terminals 200 that have responded to the participation request message and the user terminal 200 serving as the transmission source of the participation request message. The conversation group generated by the group generator 155 may be represented, for example, by a format of a conversation member list L. Specifically, when a voice message received from a user terminal 200 is a participation request message, the group generator 155 prepares an empty conversation member list L and registers the user terminal 200 serving as the transmission source of the participation request message first in the conversation member list L. Each time the response receiver 113 thereafter receives a response to the participation request message, the group generator 155 additionally registers the user terminal 200 that has responded to the participation request message in the conversation member list L.

Figure 6:
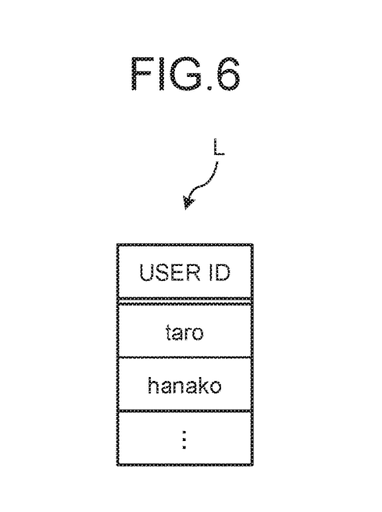
FIG. 6 is a diagram of an exemplary conversation member list.

FIG. 6 is a diagram of an exemplary conversation member list L. FIG. 6 illustrates an example in which "taro" transmits the participation request message to "hanako" and "jiro" in accordance with the group management table Tb illustrated in FIG. 5. In the conversation member list L illustrated in FIG. 6, "taro" serving as the transmission source of the participation request message is initially registered and "hanako" who has responded to the participation request message is additionally registered. Meanwhile, "jiro" from whom no response to the participation request message has been received is not registered. If a response is received from "jiro" within a predetermined period of time after the transmission of the participation request message, "jiro" is additionally registered in the conversation member list L at the particular point in time at which the response is received from "jiro". The same holds for a case in which user terminals 200 other than "hanako" and "jiro" are included in the transmission destinations of the participation request message. In this case, when a response is received within a predetermined period of time after the transmission of the participation request message to that any third user terminal 200, that particular user terminal 200 is additionally registered in the conversation member list L.

The conversation controller 156 controls delivery of the voice message in the conversation mode such that a voice message received from a member of the conversation group generated by the group generator 155 is transmitted to other members of the conversation group. The conversation controller 156 can control the delivery of the voice message in the conversation mode using the conversation member list L. Specifically, the conversation controller 156 controls the operation of the message transmitter 112 such that, when the transmission source of the voice message received by the message receiver 111 is a user terminal 200 registered in the conversation member list L, other user terminals 200 registered in the conversation member list L are determined as the transmission destinations of that particular voice message and the voice message is transmitted to the determined transmission destinations. It is noted that metadata indicating that a voice message is in the conversation mode is appended to a voice message transmitted and received in the conversation mode.

When a predetermined period of time (e.g., 30 seconds) elapses without having received any message from any of the members of a conversation group, the conversation controller 156 erases the conversation member list L to terminate the conversation mode and notifies each member of the conversation group of the termination of the conversation mode. The notification of the termination of the conversation mode can be achieved by transmitting from the message transmitter 112 a set voice message stating, for example, that "the conversation mode will be terminated" to all user terminals 200 that are members of the conversation group.

The following describes the user terminal 200. Various functions of the user terminal 200 can be achieved by, for example, installing a dedicated application program for receiving the service of the voice communication system in a smartphone and executing the application program on a computer system of the smartphone.

Figure 7:
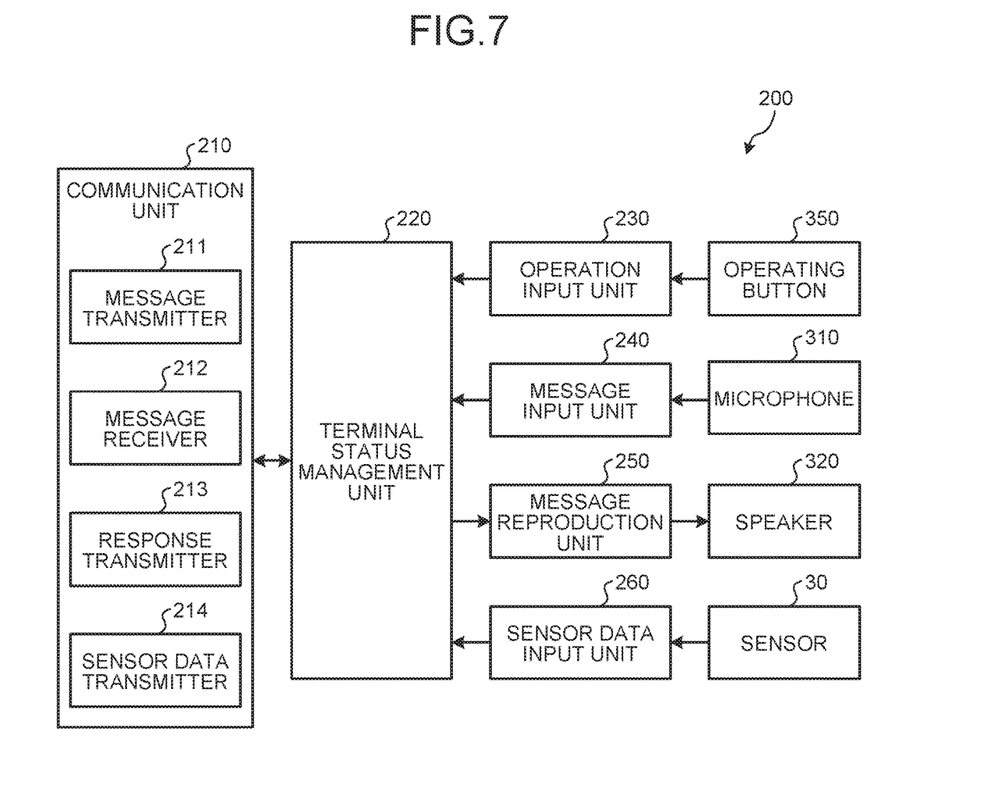
FIG. 7 is a block diagram of an exemplary functional configuration of a user terminal.

FIG. 7 is a block diagram of an exemplary functional configuration of the user terminal 200. The user terminal 200 includes, as functional elements achieved through cooperation between the hardware such as the smartphone and software (the abovementioned application program), a communication unit 210, a terminal status management unit 220, an operation input unit 230, a message input unit 240, a message reproduction unit 250, and a sensor data input unit 260 as illustrated in FIG. 7.

The communication unit 210 is a functional module that communicates with the communication support apparatus 100 over a network. The communication unit 210 includes, as sub-modules, a message transmitter 211, a message receiver 212, a response transmitter 213, and a sensor data transmitter 214. Specifically, the message transmitter 211 transmits the voice message to the communication support apparatus 100. The message receiver 212 receives the voice message from the communication support apparatus 100. The response transmitter 213 transmits a response to the participation request message to the communication support apparatus 100. The sensor data transmitter 214 transmits sensor data to the communication support apparatus 100.

The terminal status management unit 220 integrally controls an operating status of the user terminal 200. For example, when the message receiver 212 receives a voice message from the communication support apparatus 100, the terminal status management unit 220 activates the message reproduction unit 250 to output the voice message received by the message receiver 212 from the speaker 320. In addition, when the operation input unit 230 receives an operation of the operating button 350 by the user at any time at which no voice message is being reproduced, the terminal status management unit 220 activates the message input unit 240 and causes the message transmitter 211 to transmit the utterance of the user recorded by the microphone 310 as a voice message to the communication support apparatus 100. In this process, when the user performs a predetermined operation, such as pressing the operating button 350 twice in succession, and the predetermined operation is received by the operation input unit 230, the terminal status management unit 220 causes the message transmitter 211 to transmit the voice message, to which metadata indicating that the voice message is a participation request message is appended, to the communication support apparatus 100.

When the operation input unit 230 receives an operation of the operating button 350 by the user while the message input unit 240 is in an activated status, the terminal status management unit 220 deactivates the message input unit 240 to terminate the recording of the utterance by the microphone 310. Additionally, the terminal status management unit 220 activates the sensor data input unit 260 at predetermined timing and causes the sensor data transmitter 214 to transmit an output of a sensor 30, such as a position sensor and an acceleration sensor, as sensor data to the communication support apparatus 100.

When the message receiver 212 receives the participation request message from the communication support apparatus 100, the terminal status management unit 220 activates the message reproduction unit 250 to output the participation request message from the speaker 320. In this process, the terminal status management unit 220 determines whether the operation input unit 230 has received an operation of the operating button 350 by the user for a predetermined period of time (e.g., 20 seconds) after the reception of the participation request message. When the operation input unit 230 has received an operation of the operating button 350 by the user during the predetermined period of time after the reception of the participation request message, a response to the participation request message is transmitted from the response transmitter 213 to the communication support apparatus 100. In this process, the terminal status management unit 220 may activate the message input unit 240 to transmit the utterance of the user recorded by the microphone 310 as a voice message accompanying the response to the communication support apparatus 100.

The following describes a specific example of operations in the embodiment relating to the conversation mode. The following first outlines a series of operations covering from start to end of the conversation mode.

A user who initiates the conversation mode performs a predetermined operation, such as pressing the operating button 350 of the headset 300 twice in succession, and produces an utterance of a message that requests participation in the conversation mode, uttering something to the effect, for example, that "concerning XX, please anybody available participate in the conversation". Then, this utterance is recorded by the microphone 310 and transmitted as a voice message from the user terminal 200 to the communication support apparatus 100. In this process, metadata that indicates that the voice message is a participation request message is appended to the voice message.

The communication support apparatus 100, having determined that the voice message in question is a participation request message on the basis of the metadata appended to the voice message received from the user terminal 200, determines another user terminal 200 to which the participation request message is to be transmitted in accordance with, for example, the group management table Tb. The communication support apparatus 100 then transmits the participation request message to the determined other user terminal 200. Additionally, the communication support apparatus 100 starts generating the conversation group using, for example, the conversation member list L and first registers the user terminal 200 serving as the transmission source of the participation request message in the conversation member list L.

The participation request message transmitted to the other user terminal 200 from the communication support apparatus 100 is reproduced by the other user terminal 200. This reproduction results in the abovementioned utterance being output from the speaker 320, allowing a user who uses the other user terminal 200 to listen to the utterance. When this user performs a predetermined operation, such as pressing the operating button 350 within a predetermined period of time after the reception and reproduction of the participation request message, a response to the participation request message is transmitted from the other user terminal 200 to the communication support apparatus 100. In this process, the other user terminal 200 may record an utterance of the user stating, for example, "XX will participate" in the microphone 310 and transmit this utterance as a voice message to the communication support apparatus 100 together with the response to the participation request message.

When the response to the participation request message is received from the other user terminal 200 within a predetermined period of time after the transmission of the participation request message, the communication support apparatus 100 additionally registers the other user terminal 200 in the conversation member list L to add the other user terminal 200 to members of the conversation group. In addition, the communication support apparatus 100 notifies any other user terminals 200 to which the participation request message has been transmitted of the response to the participation request message received from the other user terminal 200, thereby informing which specific user terminal 200 will participate in the conversation mode.

The communication support apparatus 100, having completed generating the conversation group, controls delivery of the voice message in the conversation mode such that the voice message received from a member of the conversation group is transmitted to other members of the conversation group. If a predetermined period of time (e.g., 30 seconds) elapses without receiving any message from any member of the conversation group, the communication support apparatus 100 erases the conversation member list L to terminate the conversation mode and notifies each member of the conversation group of the end of the conversation mode.

Figure 8:
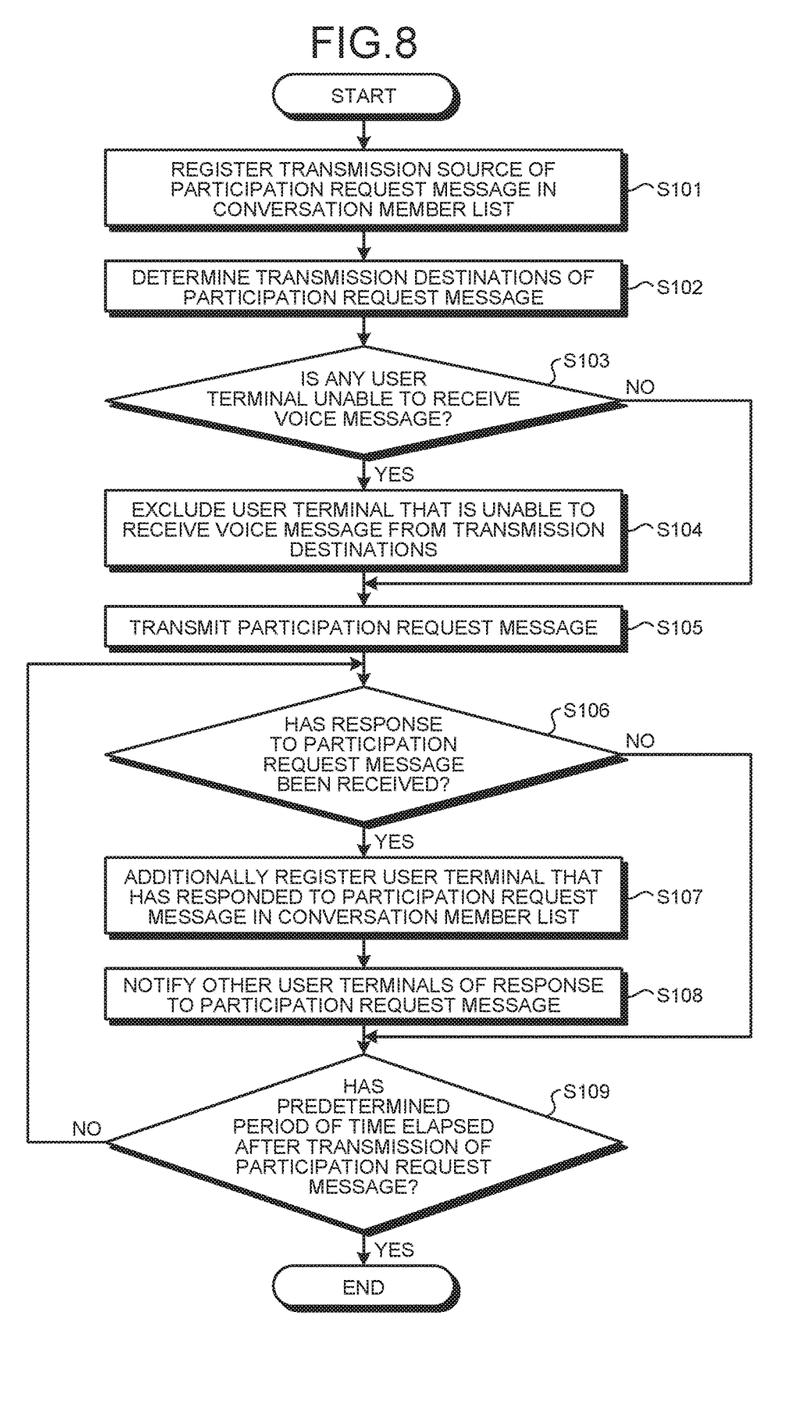
FIG. 8 is a flowchart of a process covering from reception of a participation request message to generation of a conversation group.

The following describes a process performed by the communication support apparatus 100 in the conversation mode. FIG. 8 is a flowchart of the process covering from reception of a participation request message to generation of a conversation group.

When a participation request message is received from a user terminal 200, the group generator 155 prepares an empty conversation member list L and registers the user terminal 200 serving as the transmission source of the participation request message first in the conversation member list L (Step S101).

The transmission destination determiner 152 refers to the group management table Tb to identify the participation request transmission destination group set for the user terminal 200 serving as the transmission source of the participation request message. The transmission destination determiner 152 then determines other user terminals 200 that belong to this participation request transmission destination group as the transmission destinations of the participation request message (Step S102).

The participation request transmission controller 153 determines whether any user terminals 200 out of the user terminals 200 determined as the transmission destinations of the participation request message at Step S102 are unable to receive the voice message (Step S103). If it is determined that any of the user terminals 200 determined as the transmission destinations of the participation request message is unable to receive the voice message (Yes at Step S103), the participation request transmission controller 153 excludes this particular user terminal 200 from the transmission destinations of the participation request message (Step S104) and performs Step S105. If it is determined that none of the user terminals 200 determined as the transmission destinations of the participation request message is unable to receive the voice message (No at Step S103), the participation request transmission controller 153 directly performs Step S105. At Step S105, the participation request transmission controller 153 performs control to transmit the participation request message to the user terminals 200 determined as the transmission destinations.

The group generator 155 determines whether a response to the participation request message has been received from any of the user terminals 200 to which the participation request message has been transmitted (Step S106). If it is determined that a response to the participation request message has been received (Yes at Step S106), the group generator 155 additionally registers the specific user terminal 200 that has responded to the participation request message in the conversation member list L (Step S107). In addition, the response notifier 154 notifies other user terminals 200 to which the participation request message has been transmitted of the response from the specific user terminal 200 that has responded to the participation request message (Step S108).

For a predetermined period of time (e.g., 20 seconds) after the transmission of the participation request message at Step S105 (No at Step S109), the group generator 155 and the response notifier 154 repeatedly perform the steps from Step S106 to Step S108. After the lapse of the predetermined period of time after the transmission of the participation request message (Yes at Step S109), the process illustrated in the flowchart of FIG. 8 is terminated.

Figure 9:
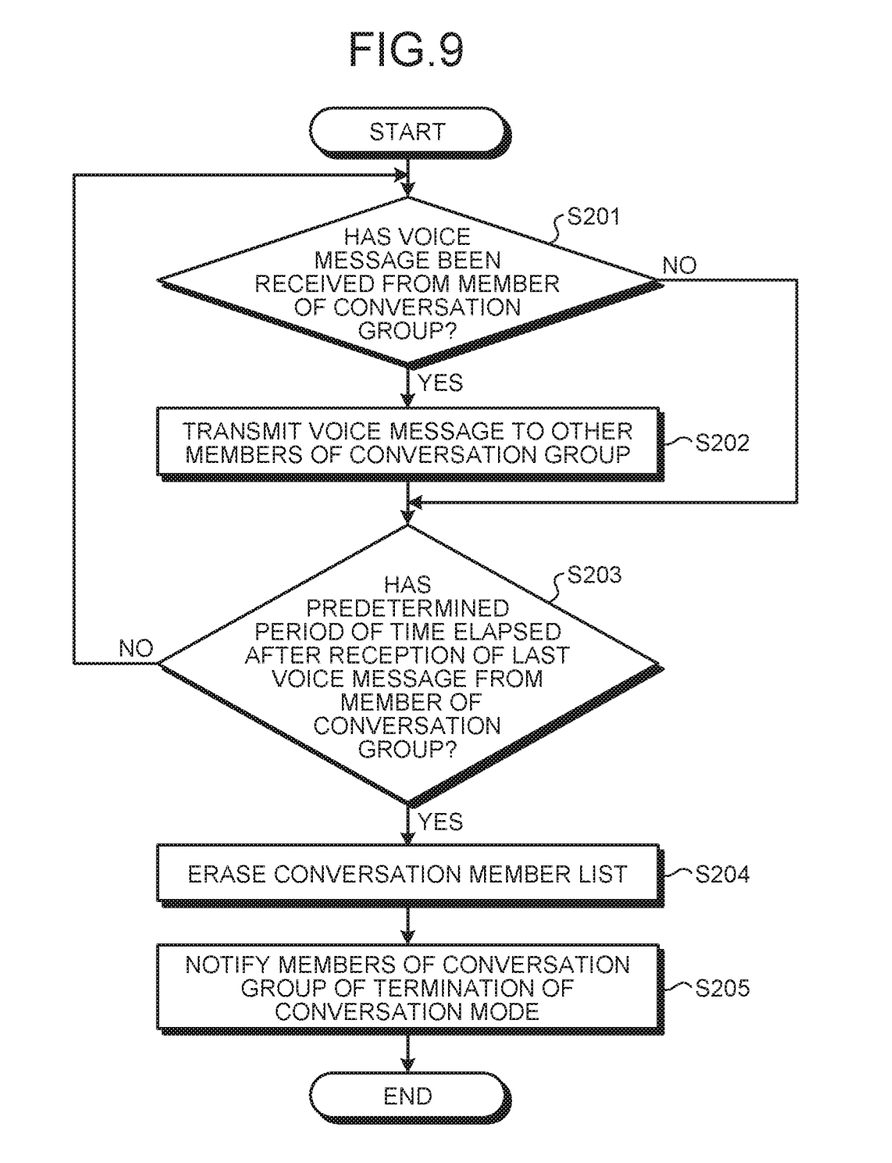
FIG. 9 is a flowchart of a process for controlling delivery through a conversation mode.

FIG. 9 is a flowchart of a process for controlling delivery through the conversation mode. The conversation mode is initiated when a plurality of user terminals 200 become members of a conversation group, specifically, when at least one user terminal 200 that has responded to the participation request message is additionally registered in the conversation member list L.

When the conversation mode is initiated, the conversation controller 156 controls the delivery of the voice message in the conversation mode. Specifically, the conversation controller 156 determines whether a voice message has been received from a member of the conversation group (Step S201). If it is determined that a voice message has been received from a member of the conversation group (Yes at Step S201), the conversation controller 156 performs control to transmit the voice message to other members of the conversation group (Step S202).

If it is determined that a voice message has not been received from a member of the conversation group (No at Step S201), the conversation controller 156 determines whether a predetermined period of time (e.g., 30 seconds) has elapsed after the reception of the last message from a member of the conversation group (Step S203). If it is determined that the predetermined period of time has elapsed after the reception of the last message from a member of the conversation group (Yes at Step S203), the conversation controller 156 erases the conversation member list L (Step S204) and notifies each of the members of the conversation group that the conversation mode has been terminated (Step S205). The notification completes the process illustrated in the flowchart of FIG. 9.

As described with reference to specific examples, in the present embodiment, the communication support apparatus 100 receives from a user terminal 200 an utterance of a user who initiates the conversation mode as a participation request message and transmits the participation request message to other user terminals 200 that are determined to be the transmission destinations of the participation request message. The communication support apparatus 100 generates a conversation group that includes as members the user terminal 200 serving as the transmission source of the participation request message and the user terminals 200 that have responded to the participation request message. The communication support apparatus 100 controls the delivery of the voice message through the conversation mode such that a voice message transmitted from a member of the conversation group is transmitted to of members of the conversation group. Thus, the present embodiment can efficiently achieve conversation among specific users through a participation request that can also convey the theme of the conversation and that can be made through a simple operation.

In the present embodiment, the communication support apparatus 100, when it receives a response to a participation request message from any of the user terminals 200 to which the participation request message has been transmitted, notifies other user terminals 200 to which the participation request message has been transmitted of that particular response. This arrangement allows the users who use the other user terminals 200 to grasp which specific user will participate in the conversation mode, so that the users can use the arrangement as a basis for determining whether the users themselves will participate in the conversation mode.

The description given above assumes that the communication support apparatus 100 transmits the participation request message to the other user terminals 200 substantially at the same time that the participation request message is received from a user terminal 200. The timing at which the participation request message is transmitted to other user terminals 200 is, however, illustrative only and not limiting. For example, the participation request message received from a user terminal 200 may be transmitted to the other user terminals 200 at a specific time specified by the user terminal 200. This arrangement enables the conversation mode to be initiated at any time desired by the user.

The description given above also assumes that the metadata of a voice message is used to determine whether the voice message is a participation request message. This is, however, not the only possible arrangement. For example, the communication support apparatus 100 may perform a voice recognition process for a voice message received from the user terminal 200 and, if a prescribed keyword is included in the text data obtained through the voice recognition process, determine that the voice message is a participation request message.

The description given above assumes that the communication support apparatus 100 determines the transmission destinations of the received participation request message as selected from among the user terminals 200 in accordance with the group management table Tb held in the user D/B 130. This is, however, not the only possible arrangement. For example, the transmission destinations of the participation request message may be determined on the basis of other types of user information relating to the user who uses the user terminal 200 of the transmission source of the participation request message, including information on tasks performed by the user and schedule information.

The description given above assumes that the messages transmitted and received by the user terminal 200 via the communication support apparatus 100 are voice messages. This is, however, not the only possible arrangement. For example, the user terminal 200 may transmit and receive via the communication support apparatus 100 messages other than the voice message, including a message of text data.

Additionally, the description given above assumes that the user terminal 200 transmits and receives messages via the communication support apparatus 100. Messages may nonetheless be transmitted and received directly to and from the user terminals 200, without having the communication support apparatus 100 intervening therebetween. In this case, at least the user terminal 200 of the user who initiates the conversation mode needs to be configured to have the functions of the communication support apparatus 100, in order to achieve transmission and reception of messages in the conversation mode in a similar manner in the transmission and reception of messages in the above-described embodiment between the user terminals 200.

Supplementary Information

Each of the various functions in the communication support apparatus 100 in the embodiment described above can be achieved through execution of a predetermined program on a computer when such a computer is used as the hardware configuration of the communication support apparatus 100. The program executed by the computer is recorded in a computer-readable recording medium such as a compact disc read only memory (CD-ROM), a flexible disk (FD), a compact disc recordable (CD-R), and a digital versatile disc (DVD), as an installable or executable file and provided as a computer program product.

The program executed by the computer may be stored in a computer connected to a network such as the Internet and provided by being downloaded via the network. Furthermore, the program executed by the computer may be provided or distributed via a network such as the Internet. The program executed by the computer may even be provided by being incorporated in advance in, for example, the ROM 13 or the HDD 14 in the computer.

The program executed by the computer has a modular configuration including the above-described functional elements of the communication support apparatus 100. Each functional element is loaded on a main storage such as the RAM 12 and generated on the main storage as a result, for example, of the CPU 11 loading the program from the above-described storage media and executing the loaded program. It is noted that the functional elements of the communication support apparatus 100 may be achieved in part or in whole using dedicated hardware such as an application specific integrated circuit (ASIC) and a field-programmable gate array (FPGA).

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A communication support apparatus that supports communication among users by delivering messages to user terminals, the apparatus comprising:
 a message receiver to receive a message from a user terminal;
 a participation request transmission controller to control, when the received message is a participation request message that requests participation in a conversation mode, the participation request message to be transmitted to a user terminal to which the participation request message is to be transmitted;
a response receiver to receive a response to the participation request message from the user terminal to which the participation request message has been transmitted;
a group generator to generate a conversation group that includes as members the user terminal that has responded to the participation request message and the user terminal serving as a transmission source of the participation request message; and
a conversation controller to control delivery of messages in the conversation mode such that a message received from a member of the conversation group is transmitted to another member of the conversation group, wherein the participation request transmission controller determines whether the user terminals to which the participation request message is to be transmitted are ready to receive a message and performs control to transmit the participation request message to user terminals that are ready to receive the message.

2. The apparatus according to claim 1, further comprising:
a response notifier to notify, when a response to the participation request message is received from a user terminal, another user terminal to which the participation request message has been transmitted of the response.

3. The apparatus according to claim 1, wherein the received message is a voice message that records an utterance of a user.

4. The apparatus according to claim 1, further comprising:
a user information storage to store therein user information; and
a transmission destination determiner to determine user terminals to which the participation request message is to be transmitted using user information associated with the user terminal serving as the transmission source of the participation request message.

5. The apparatus according to claim 1, wherein the conversation controller notifies the members of the conversation group of termination of the conversation mode after a lapse of a first period of time during which no message is received from any of the members of the conversation group.

6. The apparatus according to claim 1, wherein the response to the participation request message is transmitted when a first predetermined operation is performed before a lapse of, in a user terminal that has received the participation request message, a predetermined period of time after the user terminal receives the participation request message.

7. The apparatus according to claim 1, wherein
metadata is appended to a message that is input together with a second predetermined operation performed in a user terminal, the metadata indicating that the message is a participation request message, and
the apparatus further comprises a metadata analyzer to determine whether the message is the participation request message using the metadata appended to the message.

8. The apparatus according to claim 1, wherein the participation request transmission controller performs control to transmit the participation request message to the user terminal at a specified time.

9. A method for supporting communication, performed in a communication support apparatus that supports communication among users by delivering messages to user terminals, the method comprising:
receiving a message from a user terminal;
controlling, when the received message is a participation request message that requests participation in a conversation mode, the participation request message to be transmitted to a user terminal to which the participation request message is to be transmitted;
receiving a response to the participation request message from the user terminal to which the participation request message has been transmitted;
generating a conversation group that includes as members the user terminal that has responded to the participation request message and the user terminal serving as a transmission source of the participation request message; and
controlling delivery of messages in the conversation mode such that a message received from a member of the conversation group is transmitted to another member of the conversation group, wherein the controlling the participation request message includes determining whether the user terminals to which the participation request message is to be transmitted are ready to receive a message and performs control to transmit the participation request message to user terminals that are ready to receive the message.

10. A computer program product comprising a non-transitory computer-readable medium including a computer program causing a computer to perform:
receiving a message from a user terminal;
controlling, when the received message is a participation request message that requests participation in a conversation mode, the participation request message to be transmitted to a user terminal to which the participation request message is to be transmitted;
receiving a response to the participation request message from the user terminal to which the participation request message has been transmitted;
generating a conversation group that includes as members the user terminal that has responded to the participation request message and the user terminal serving as a transmission source of the participation request message; and
controlling delivery of messages in the conversation mode such that a message received from a member of the conversation group is transmitted to another member of the conversation group, wherein the controlling the participation request message includes determining whether the user terminals to which the participation request message is to be transmitted are ready to receive a message and performs control to transmit the participation request message to user terminals that are ready to receive the message.

* * * * *